US012618699B2

(12) United States Patent
Xu et al.

(10) Patent No.: US 12,618,699 B2
(45) Date of Patent: May 5, 2026

(54) ULTRASONIC GAS METER BASED ON SHUNT METERING DEVICE

(71) Applicant: ZENNER METERING TECHNOLOGY (SHANGHAI) LTD., Shanghai (CN)

(72) Inventors: Ronghua Xu, Shanghai (CN); Haijun Ren, Shanghai (CN); Shihua Li, Shanghai (CN); Wenjun Wang, Shanghai (CN)

(73) Assignee: ZENNER METERING TECHNOLOGY (SHANGHAI) LTD., Shanghai (CN)

( * ) Notice: Subject to any disclaimer, the term of this patent is extended or adjusted under 35 U.S.C. 154(b) by 353 days.

(21) Appl. No.: 18/402,745

(22) Filed: Jan. 3, 2024

(65) Prior Publication Data

US 2025/0116542 A1    Apr. 10, 2025

(30) Foreign Application Priority Data

Oct. 7, 2023    (CN) .......................... 202311279284.8

(51) Int. Cl.
G01F 1/66      (2022.01)
F15D 1/00      (2006.01)
G01F 1/667     (2022.01)
(52) U.S. Cl.
CPC ........... G01F 1/662 (2013.01); F15D 1/0005 (2013.01); G01F 1/667 (2013.01)

(58) Field of Classification Search
CPC ... G01F 1/66–668; F15D 1/0005; F15D 1/006
See application file for complete search history.

(56) References Cited

U.S. PATENT DOCUMENTS

| | | | | |
|---|---|---|---|---|
| 7,237,441 | B2 * | 7/2007 | Umekage ................ | G01F 1/667 |
| | | | | 73/861.27 |
| 11,686,604 | B2 * | 6/2023 | Takahashi ............... | G01F 15/00 |
| | | | | 73/861.27 |
| 12,372,391 | B2 * | 7/2025 | Liu ....................... | G05D 11/132 |

* cited by examiner

*Primary Examiner* — Justin N Olamit
(74) *Attorney, Agent, or Firm* — Bayramoglu Law Offices LLC

(57)        ABSTRACT

An ultrasonic gas meter based on a shunt metering device is provided. The ultrasonic gas meter includes a gas meter casing, and a gas flow stabilizer for stabilizing a gas flow is provided in the gas meter casing. A middle of the gas meter casing is provided with a gas port for gas circulation. A middle of a cavity of the gas port is provided with an ultrasonic metering device for metering a gas. An end of the cavity of the gas port is provided with a shunting plate for shunting the gas. The ultrasonic gas meter slows down and finally stabilizes a gas flow through the cooperation of a first stabilizing assembly, a second stabilizing assembly, a third stabilizing assembly, a limiting assembly, and a rotating assembly. In addition, the service life of the ultrasonic gas meter is extended through a filter screen.

9 Claims, 7 Drawing Sheets

113

112

001

100

111

110

ULTRASONIC GAS METER BASED ON SHUNT METERING DEVICE

CROSS REFERENCE TO THE RELATED APPLICATIONS

This application is based upon and claims priority to Chinese Patent Application No. 202311279284.8, filed on Oct. 7, 2023, the entire contents of which are incorporated herein by reference.

TECHNICAL FIELD

The present disclosure relates to the technical field of gas flow measurement of ultrasonic gas meters, and in particular to an ultrasonic gas meter based on a shunt metering device.

BACKGROUND

An existing ultrasonic gas meter with a shunt metering device uses a time difference method to measure the volume of gas passing through a gas pipeline per unit time and detect a time difference between a forward flow ultrasonic signal and a reverse flow ultrasonic signal propagated in the gas. A gas flow velocity is calculated based on the time difference, and a gas flow rate passing through the gas pipeline per unit time is calculated based on the gas flow velocity.

The gas flow rate at the center of the gas pipeline is usually greater than those at two side walls of the gas pipeline. Therefore, when a large flow of gas passes through the gas pipeline and the gas flow rate at the center of the gas pipeline is greater than those at side walls of the gas pipeline, the ultrasonic signal at the center of the gas pipeline will be significantly affected, thereby affecting the accuracy of the final measurement result.

SUMMARY

To solve the problem mentioned in the background, that is, the gas flow rate at the center of the gas pipeline is greater than that at the two side walls of the gas pipeline, which can easily affect the measurement result, the present disclosure provides the following technical solution.

An ultrasonic gas meter based on a shunt metering device includes a gas meter casing, where a gas flow stabilizer for stabilizing a gas flow is provided in the gas meter casing;

a middle of the gas meter casing is provided with a gas port for gas circulation; a middle of a cavity of the gas port is provided with an ultrasonic metering device for metering a gas; and an end of the cavity of the gas port is provided with a shunting plate for shunting the gas;

the gas flow stabilizer includes a first stabilizing assembly for blocking the gas and a second stabilizing assembly for cooperating with the first stabilizing assembly to block the gas; and the gas flow stabilizer further includes a limiting assembly for supporting and limiting the first stabilizing assembly and the second stabilizing assembly; an end of the limiting assembly is provided with a third stabilizing assembly for cooperating with the gas to adjust an angle between the first stabilizing assembly and the second stabilizing assembly; and a rotating assembly is provided in the limiting assembly and is configured to cooperate with the third stabilizing assembly to control the second stabilizing assembly to rotate.

Further, an inlet end of the gas meter casing is provided with a filter screen for filtering out an impurity.

Further, the first stabilizing assembly includes a first baffle for blocking the gas; upper and lower ends of a side of the first baffle are respectively provided with first connecting rings for limiting the first baffle; an end of the first connecting ring is provided with a first tooth block set for cooperating with the limiting assembly to control the first baffle to rotate; a middle of the first connecting ring is provided with a first connecting hole for the limiting assembly to rotate; and inner walls of upper and lower ends of a cavity of the first connecting hole are respectively provided with first limiting ring elements for cooperating with the limiting assembly to limit the first stabilizing assembly.

Further, the second stabilizing assembly includes a second baffle for cooperating with the first baffle to block the gas; upper and lower ends of a side of the second baffle are respectively provided with second connecting rings for limiting the second baffle; an end of the second connecting ring is provided with a second tooth block set for cooperating with the limiting assembly to control the first connecting ring to rotate; the first connecting hole is concentric with a second connecting hole; and the first connecting rings are located between the two second connecting rings.

Further, a middle of the second connecting ring is provided with the second connecting hole for the limiting assembly to rotate; inner walls of upper and lower ends of a cavity of the second connecting hole are respectively provided with second limiting ring elements for cooperating with the limiting assembly to limit the second stabilizing assembly; and a middle of the cavity of the second connecting hole is provided with a third tooth block set for cooperating with the rotating assembly to control the second stabilizing assembly to rotate.

Further, the third stabilizing assembly includes first limiting rods; and one end of the first limiting rod is provided with a fourth tooth block set for controlling the rotating assembly to rotate, and the other end of the first limiting rod is provided with a third baffle for controlling the first limiting rod to extend and retract.

Further, the limiting assembly includes a second limiting rod; upper and lower ends of the second limiting rod are respectively provided with limiting holes for limiting the first limiting rods; the upper and lower ends of the second limiting rod are further respectively provided with first limiting ring grooves for the second limiting ring elements to rotate; the upper and lower ends of the second limiting rod are further respectively provided with second limiting ring grooves for the first limiting ring elements to rotate; and the limiting holes, the first limiting ring grooves, and the second limiting ring grooves are arranged on a rod body of the second limiting rod in an order below: the limiting hole, the first limiting ring groove, the second limiting ring groove, the second limiting ring groove, the first limiting ring groove, and the limiting hole.

Further, upper and lower ends of the rod body of the second limiting rod are respectively provided with fan-shaped grooves for the rotating assembly to rotate; the fan-shaped grooves are located between adjacent first limiting ring grooves; the upper and lower ends of the second limiting rod are further respectively provided with first gears for cooperating with the second connecting rings to control the first connecting rings to rotate in reverse; a middle of the first gear is connected to a connecting rod for cooperating with the second limiting rod to limit the first gear; one end of the connecting rod is meshed with a second tooth block set, and the other end of the connecting rod is meshed with a first tooth block set; and the connecting rod is located between the first limiting ring groove and the second limiting ring groove.

Further, the rotating assembly includes a long rod; upper and lower ends of the long rod are respectively provided with second gears for cooperating with the first limiting rods to control the long rod to rotate; the upper and lower ends of the long rod are further respectively provided with special-shaped gears for controlling the second baffle to rotate; and the special-shaped gears are respectively meshed with third tooth block sets.

Compared with the prior art, the present disclosure has the following beneficial effects:

In the present disclosure, through the cooperation of the first stabilizing assembly, the second stabilizing assembly, the third stabilizing assembly, the limiting assembly, and the rotating assembly, the gas flow slows down and is finally stabilized, making the measurement of the ultrasonic metering device more accurate. In addition, the filter screen extends the service life of the ultrasonic gas meter.

Figure 1:
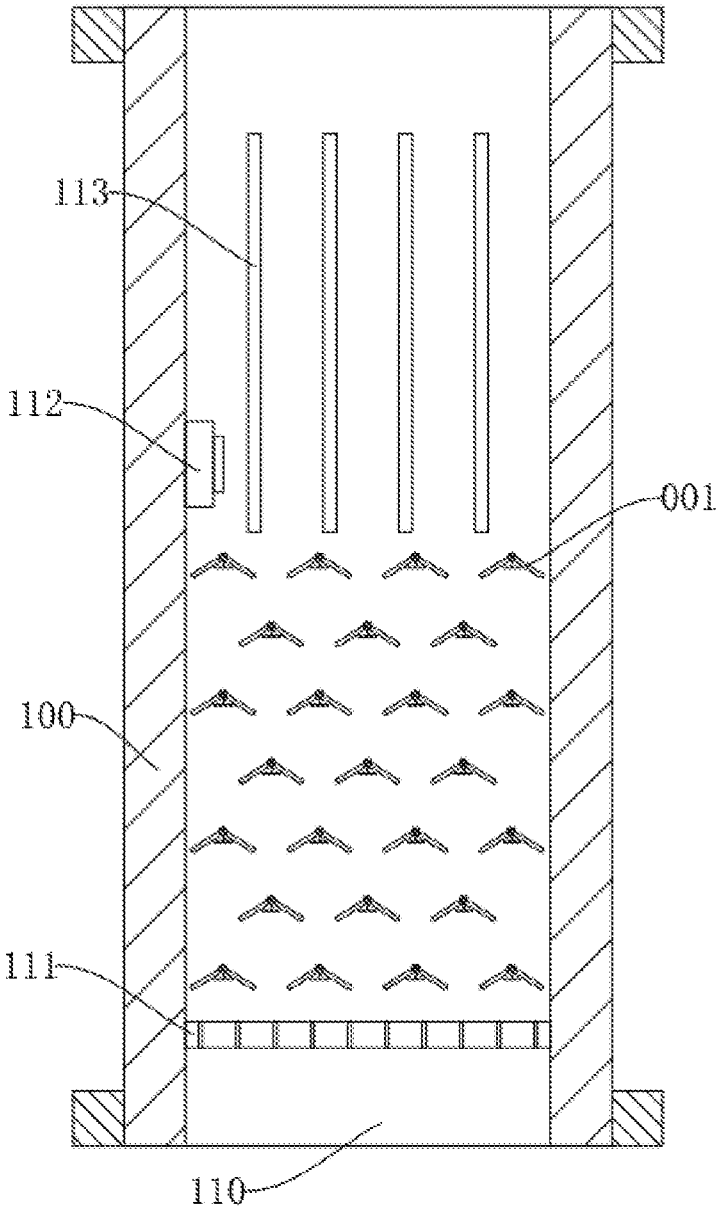
FIG. 1 is an interior view of an ultrasonic gas meter according to the present disclosure.

REFERENCE NUMERALS 100. gas meter casing;
110. gas port; 111. filter screen; 112. ultrasonic metering device; and 113. shunting plate;
001. gas flow stabilizer;
200. first stabilizing assembly; 210. first baffle; 211. first arc-shaped edge; 220. first connecting ring; 221. first connecting hole; 222. first tooth block set; and 223. first limiting ring element;
300. second stabilizing assembly; 310. second baffle; 311. second arc-shaped edge; 320. second connecting ring; 321. second connecting hole; 322. second tooth block set; 323. second limiting ring element; and 324. third tooth block set;
400. third stabilizing assembly; 410. first limiting rod; 411. fourth tooth block set; and 420. third baffle;
500. limiting assembly; 510. second limiting rod; 511. limiting hole; 512. first limiting ring groove; 513. second limiting ring groove; 514. fan-shaped groove; 520. first gear; and 521. connecting rod; and
600. rotating assembly; 610. long rod; 620. second gear; and 630. special-shaped gear.

DETAILED DESCRIPTION OF THE EMBODIMENTS

The preferred specific implementations of the present disclosure are described clearly, completely and in detail below according to the drawings.

Figure 2:
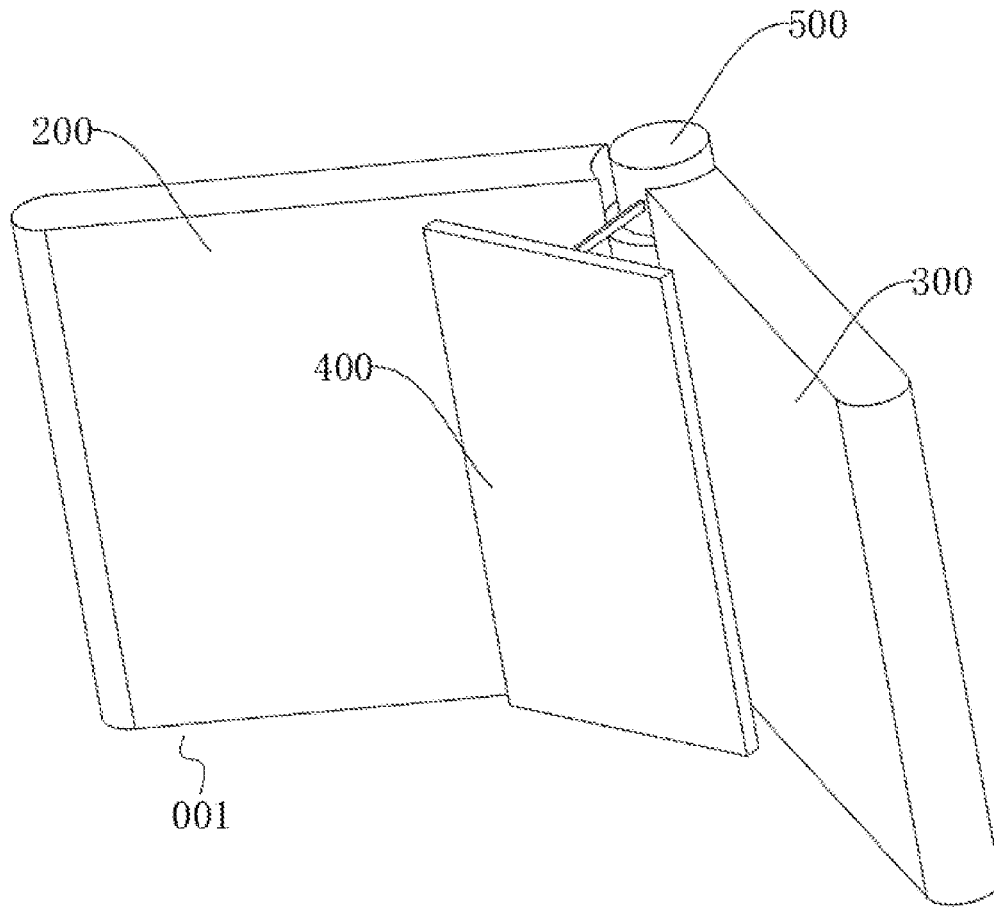
FIG. 2 is a structural diagram of a gas flow stabilizer according to the present disclosure.
Figure 3:
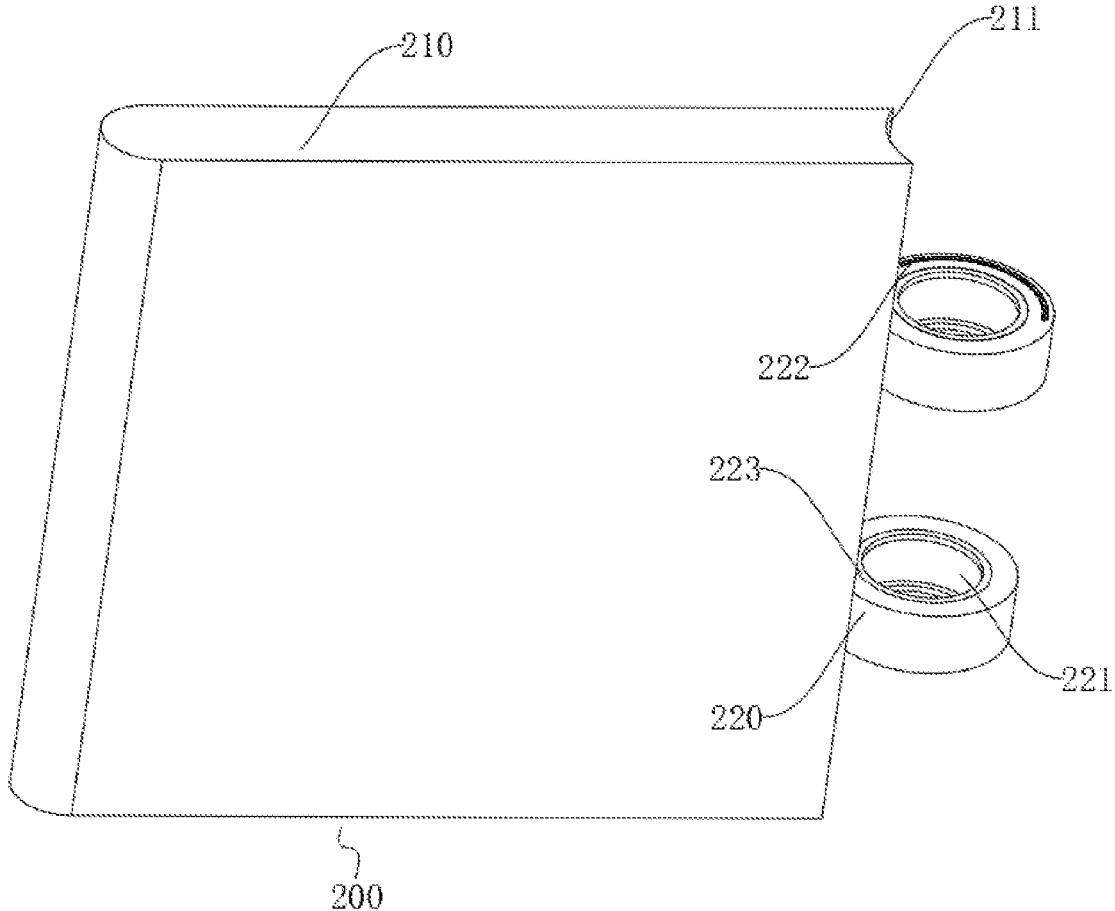
FIG. 3 is a structural diagram of a first stabilizing assembly according to the present disclosure.
Figure 4:
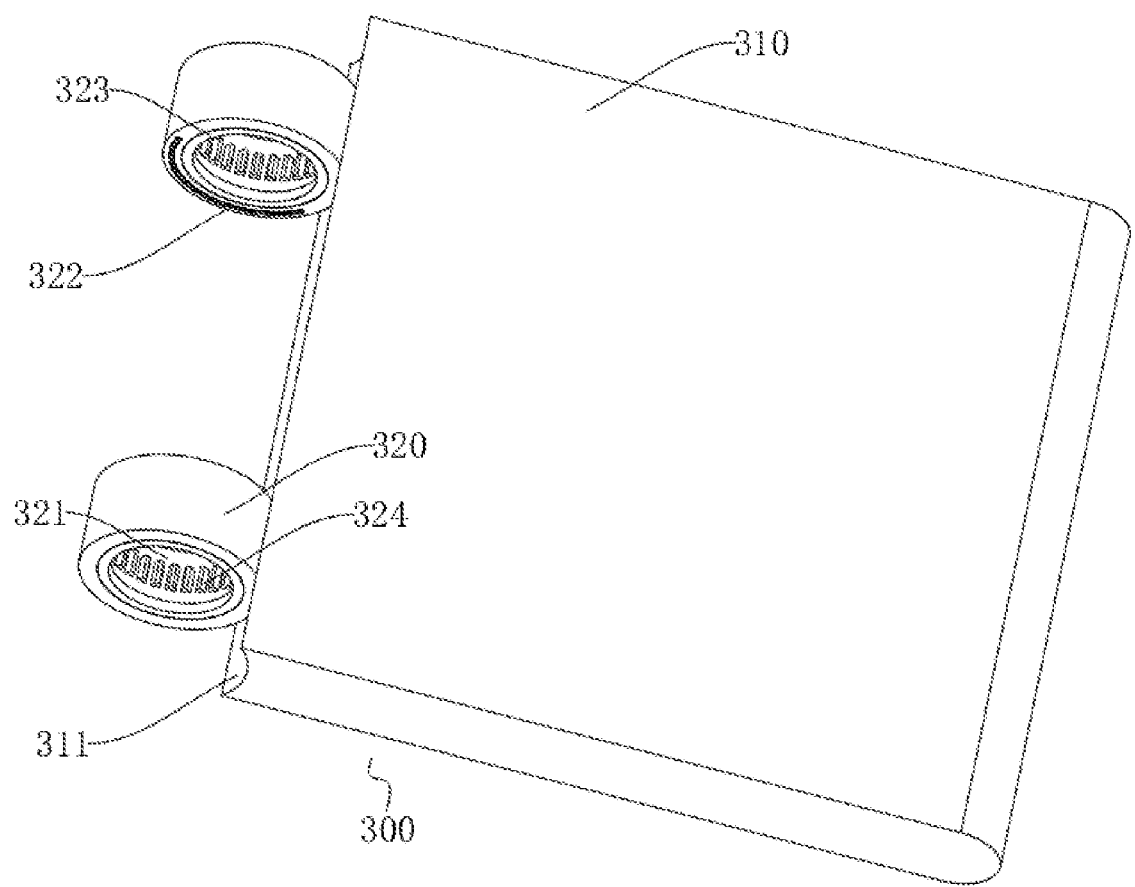
FIG. 4 is a structural diagram of a second stabilizing assembly according to the present disclosure.
Figure 5:
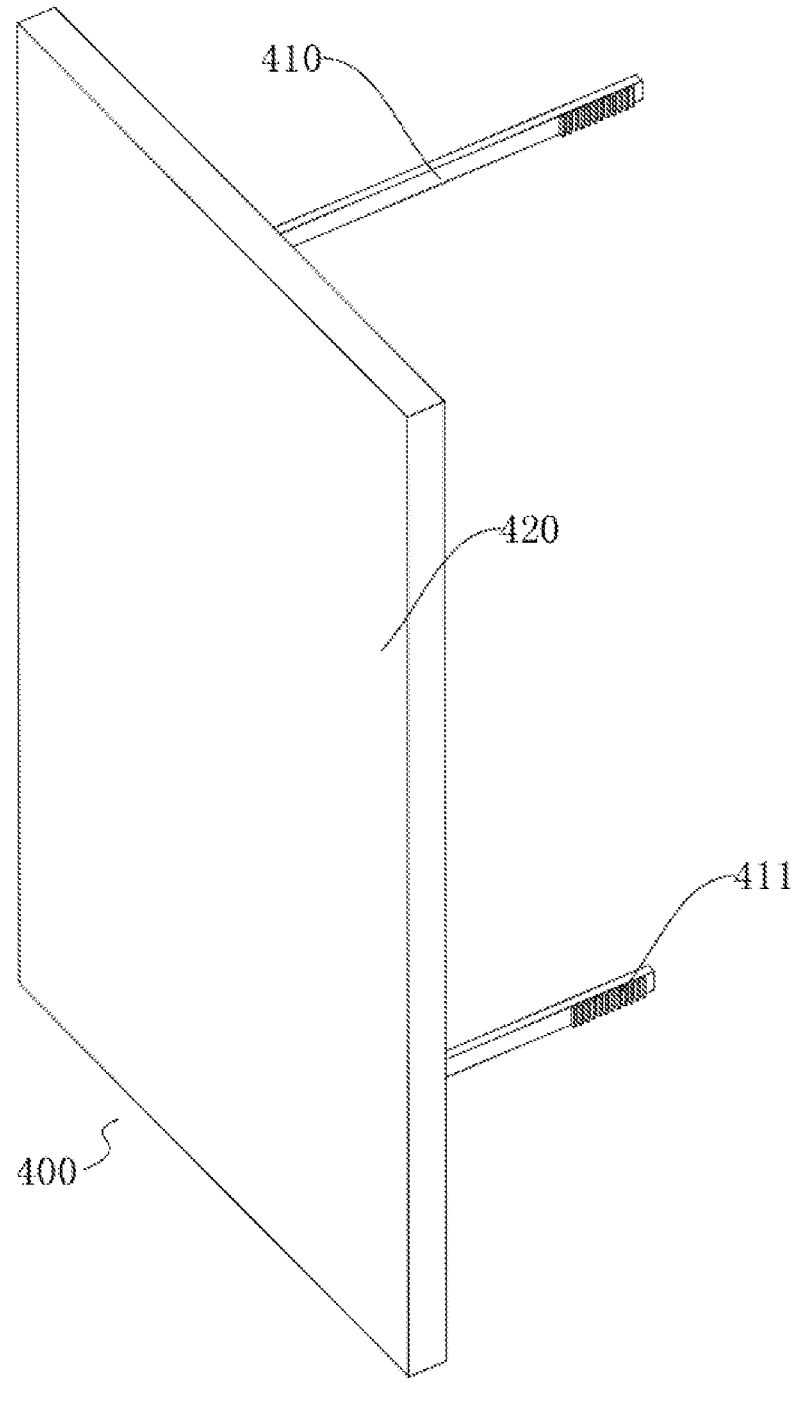
FIG. 5 is a structural diagram of a third stabilizing assembly according to the present disclosure.
Figure 6:
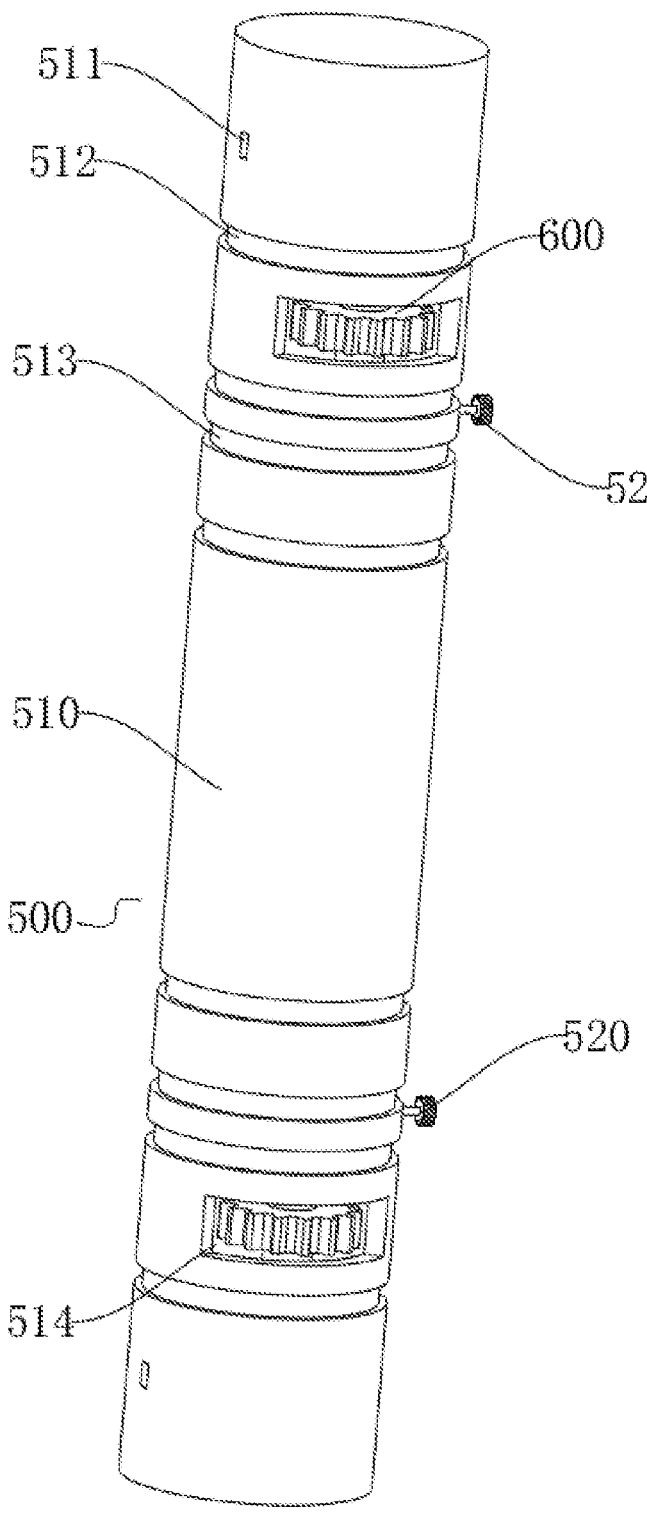
FIG. 6 is a structural diagram of a limiting assembly according to the present disclosure.
Figure 7:
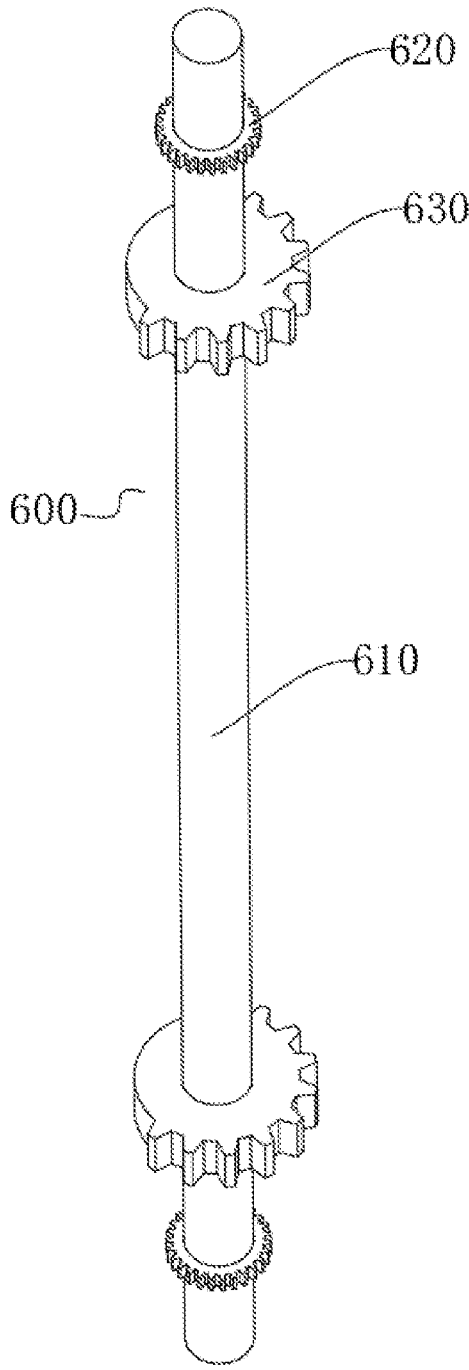
FIG. 7 is a structural diagram of a rotating assembly according to the present disclosure.

Referring to FIGS. 1 to 7, the present disclosure provides an ultrasonic gas meter based on a shunt metering device. The present disclosure ensures that the flow velocity and flow rate of gas in each gas groove are the same, and improves the measurement accuracy of ultrasonic metering device 112.

A middle of gas meter casing 100 is provided with gas port 110 for gas circulation. The inlet end of the gas meter casing 100 is provided with filter screen 111 for filtering out an impurity. A gas inlet is provided at one end close to the filter screen 111, and a gas outlet is provided at the other end. A plurality of gas holes with different sizes are provided at a middle of the filter screen 111. The filter screen 111 blocks impurities in the gas before the gas flows towards gas flow stabilizers 001. Thus, the gas flowing to the ultrasonic metering device 112 and shunting plate 113 is cleaner, and a surface of the ultrasonic metering device 112 can keep clean for a long time, thereby improving measurement accuracy and extending the service life of the ultrasonic gas meter.

The ultrasonic metering device 112 is configured to perform ultrasonic metering on the gas and fixedly provided at a middle of a cavity of the gas port 110. The shunting plate 113 is configured to shunt the gas and provided at an end of the cavity of the gas port 110. The shunting plate 113 is combined with an inner wall of the gas port 110 to form a plurality of gas grooves. The ultrasonic metering device 112 is located in one of the gas grooves for ultrasonic measurement of the gas. When the gas enters from the gas inlet of the gas port 110, the gas is filtered by the filter screen 111, allowing clean gas to pass through the gas flow stabilizers 001 for stabilization. Thus, the gas flows smoothly to the shunting plate 113, and the gas flow in the plurality of gas grooves is stable, ensuring more accurate measurement by the ultrasonic metering device 112.

A plurality of gas flow stabilizers 001 for stabilizing the gas flow are provided in the gas meter casing 100. The gas flow stabilizers 001 each include first stabilizing assembly 200 for blocking the gas flow. The first stabilizing assembly 200 includes first baffle 210 for blocking the gas. A side of the first baffle 210 is provided with first arc-shaped edge 211, facilitating the first baffle 210 to block the gas when it rotates around a rod body of second limiting rod 510, thereby preventing the gas from flowing through a gap formed between the first baffle 210 and the second limiting rod 510. Upper and lower ends of a side of the first baffle 210 are respectively fixedly provided with first connecting rings 220 for limiting the first baffle 210. When the first connecting rings 220 rotate, they synchronously drive the first baffle 210 to rotate. An end of the first connecting ring 220 is provided with first tooth block set 222 for cooperating with limiting assembly 500 to control the first baffle 210 to rotate. The first tooth block set 222 meshes with first gear 520. When second connecting rings 320 rotate, they drive the first gears 520 to rotate, and when the first gears 520 rotate, they drive the first connecting rings 220 to rotate in reverse. The first stabilizing assembly 200 and the second stabilizing assembly 300 rotate in opposite directions. A middle of the first connecting ring 220 is provided with first connecting hole 221 for the limiting assembly 500 to rotate. Inner walls of upper and lower ends of a cavity of the first connecting hole 221 are respectively fixedly provided with first limiting ring elements 223 for cooperating with the limiting assembly 500 to limit the first stabilizing assembly 200. The first limiting ring elements 223 rotate in cavities of second limiting ring grooves 513. A diameter of the cavity of the first connecting hole 221 is greater than a diameter of the second limiting rod 510 to avoid contact between an inner wall of the first connecting hole 221 and an outer wall of the second limiting rod 510.

The gas flow stabilizer 001 includes the second stabilizing assembly 300 for cooperating with the first stabilizing assembly 200 to block the gas. The second stabilizing assembly 300 includes second baffle 310 for cooperating with the first baffle 210 to block the gas. A side of the second baffle 310 is provided with second arc-shaped edge 311, facilitating the second baffle 310 to block the gas when it rotates around a rod body of the second limiting rod 510, thereby preventing the gas from flowing through a gap formed between the second baffle 310 and the second limiting rod 510. Upper and lower ends of a side of the second baffle 310 are respectively fixedly provided with second connecting rings 320 for limiting the second baffle 310. When the second connecting rings 320 rotate, they synchronously drive the second baffle 310 to rotate. An end of the second connecting ring 320 is fixedly provided with second tooth block set 322 for cooperating with the limiting assembly 500 to control the first connecting ring 220 to rotate. The first connecting hole 221 and the second connecting hole 321 are concentric. The first connecting rings 220 are located between the two second connecting rings 320. There are two second connecting rings 320 and two first connecting rings 220. For the second connecting ring 320 located at the upper end of the second baffle 310, the second tooth block set 322 is provided at a lower end of the second connecting ring 320. For the second connecting ring 320 located at the lower end of the second baffle 310, the second tooth block set 322 is provided at an upper end of the second connecting ring 320. For the first connecting ring 220 located at the upper end of the first baffle 210, the first tooth block set 222 is provided at an upper end of the first connecting ring 220. For the first connecting ring 220 located at the lower end of a side of the first baffle 210, the first tooth block set 222 is provided at a lower end of the first connecting ring 220. The first tooth block set 222 at the upper end of the first connecting ring 220 and the second tooth block set 322 at the lower end of the second connecting ring 320 are symmetrically arranged. The first tooth block set 222 at the lower end of the first connecting ring 220 and the second tooth block set 322 at the upper end of the second connecting ring 320 are symmetrically arranged.

A middle of the second connecting ring 320 is provided with second connecting hole 321 for the limiting assembly 500 to rotate. Inner walls of upper and lower ends of a cavity of the second connecting hole 321 are respectively fixedly provided with second limiting ring elements 323 for cooperating with the limiting assembly 500 to limit the second stabilizing assembly 300. The second limiting ring element 323 rotates in a cavity of first limiting ring groove 512. A middle of the cavity of the second connecting hole 321 is fixedly provided with third tooth block set 324 for cooperating with rotating assembly 600 to control the second stabilizing assembly 300 to rotate. When the gas drives the third stabilizing assembly 400, the third stabilizing assembly 400 drives first limiting rods 410 to move, causing fourth tooth block sets 411 to drive the rotating assembly 600 to rotate. Special-shaped gears 630 are respectively meshed with the second limiting ring elements 323 and drive the second connecting ring 320 to rotate. The second connecting rings 320 drive the first gears 520 to rotate. The first gears 520 drive the first connecting rings 220 to rotate in reverse. The second stabilizing assembly 300 and the first stabilizing assembly 200 rotate in opposite directions.

If the gas flows to the third stabilizing assembly 400 at a velocity greater than a velocity at which the gas flows to the first stabilizing assembly 200 and the second stabilizing assembly 300, the gas can easily push the third stabilizing assembly 400, causing the third stabilizing assembly 400 to cooperate with the limiting assembly 500 and the rotating assembly 600 to drive the first stabilizing assembly 200 and the second stabilizing assembly 300 to rotate, thereby changing the flow velocity of the gas. The first stabilizing assembly 200 and the second stabilizing assembly 300 are inclined to guide the gas. The gas flow stabilizers 001 are arranged in multiple layers. The first stabilizing assembly 200 in a subsequent layer drives the gas to push the second stabilizing assembly 300 in a previous layer, while the second stabilizing assembly 300 in the subsequent layer drives the gas to push the first stabilizing assembly 200 in the previous layer. When the gas is unstable, it offers a greater push on the third stabilizing assembly 400, resulting in a smaller angle between the first stabilizing assembly 200 and the second stabilizing assembly 300, thereby driving the gas to return. The returning gas and the incoming gas collide, slowing down the incoming gas. Through the gas flow stabilizer 001, the gas flowing towards the shunting plate 113 and the returning gas reach equilibrium, such that the gas flow rate in each of the gas grooves is the same. In this way, the ultrasonic metering device 112 achieves more accurate measurement.

The gas flow stabilizer 001 includes the limiting assembly 500 for supporting and limiting the first stabilizing assembly 200 and the second stabilizing assembly 300. The limiting assembly 500 includes the second limiting rod 510. Upper and lower ends of the second limiting rod 510 are respectively provided with limiting holes 511 for limiting the first limiting rods 410. The first limiting rods 410 can be extended and retracted in cavities of the limiting holes 511. The upper and lower ends of the second limiting rod 510 are respectively provided with the first limiting ring grooves 512 for the second limiting ring elements 323 to rotate. The upper and lower ends of the second limiting rod 510 are respectively provided with the second limiting ring grooves 513 for the first limiting ring elements 223 to rotate. The limiting holes 511, the first limiting ring grooves 512, and the second limiting ring grooves 513 are arranged on the rod body of the second limiting rod 510 in an order below: the limiting hole 511, the first limiting ring groove 512, the second limiting ring groove 513, the second limiting ring groove 513, the first limiting ring groove 512, and the limiting hole 511.

The upper and lower ends of the rod body of the second limiting rod 510 are respectively provided with fan-shaped grooves 514 for the rotating assembly 600 to rotate. The fan-shaped grooves 514 are located between adjacent first limiting ring grooves 512. The special-shaped gears 630 respectively rotate in cavities of the fan-shaped grooves 514, and the special-shaped gears 630 are respectively meshed with third tooth block sets 324. The upper and lower ends of the second limiting rod 510 are respectively provided with the first gears 520 for cooperating with the second connecting rings 320 to control the first connecting rings 220 to rotate in reverse. A middle of the first gear 520 is hinged to connecting rod 521 for cooperating with the second limiting rod 510 to limit the first gear 520. One end of the connecting rod 521 is fixedly provided on the rod body of the second limiting rod 510. The upper and lower ends of the rod body of the second limiting rod 510 are respectively fixedly provided at upper and lower ends of the cavity of the gas port 110. One end of the connecting rod 521 meshes with the second tooth block set 322, and the other end of the connecting rod 521 meshes with the first tooth block set 222. The connecting rod 521 is located on the rod body of the second limiting rod 510 between the first limiting ring groove 512 and the second limiting ring groove 513. When the second connecting ring 320 rotates, it drives the first gear 520 to rotate. When the first gear 520 rotates, it drives the first connecting ring 220 to rotate in reverse.

An end of the limiting assembly 500 is provided with the third stabilizing assembly 400 for cooperating with the gas to adjust the angle between the first stabilizing assembly 200 and the second stabilizing assembly 300. The third stabilizing assembly 400 includes first limiting rods 410. One end of the first limiting rod 410 is fixedly provided with the fourth tooth block set 411 for controlling the rotating assembly 600 to rotate. The other end of the first limiting rod 410 is provided with the third baffle 420 for cooperating with the gas to control the first limiting rod 410 to extend and retract in a cavity of the limiting assembly 500. When the first limiting rod 410 extends and retracts, the fourth tooth block set 411 drives the second gear 620 to rotate.

The rotating assembly 600 is provided in the limiting assembly 500 and is configured to cooperate with the third stabilizing assembly 400 to control the second stabilizing assembly 300 to rotate. The rotating assembly 600 includes long rod 610. Upper and lower ends of the long rod 610 are respectively fixedly provided with second gears 620 for cooperating with the first limiting rods 410 to control the long rod 610 to rotate. The fourth tooth block set 411 meshes with the second gear 620. The upper and lower ends of the long rod 610 are respectively provided with the special-shaped gears 630 for controlling the second baffle 310 to rotate. The special-shaped gears 630 are respectively meshed with third tooth block sets 324. When the first limiting rod 410 controls the second gears 620 to rotate, it synchronously drives the long rod 610 to rotate, causing the special-shaped gears 630 to synchronously drive the second stabilizing assembly 300 to rotate. The second stabilizing assembly 300 drives the first stabilizing assembly 200 to rotate in reverse. In this way, the gas flow is stabilized.

Those skilled in the art can understand and implement the present disclosure based on the above content and drawings. In addition, those skilled in the art can make modifications to the present disclosure without creative efforts, but such modifications should fall within the scope of protection of the present disclosure.

What is claimed is:

1. An ultrasonic gas meter based on a shunt metering device, comprising a gas meter casing, wherein a gas flow stabilizer for stabilizing a gas flow is provided in the gas meter casing;

a middle of the gas meter casing is provided with a gas port for gas circulation; a middle of a cavity of the gas port is provided with an ultrasonic metering device for metering a gas; and an end of the cavity of the gas port is provided with a shunting plate for shunting the gas;

the gas flow stabilizer comprises a first stabilizing assembly for blocking the gas and a second stabilizing assembly for cooperating with the first stabilizing assembly to block the gas; and the gas flow stabilizer further comprises a limiting assembly for supporting and limiting the first stabilizing assembly and the second stabilizing assembly; an end of the limiting assembly is provided with a third stabilizing assembly for cooperating with the gas to adjust an angle between the first stabilizing assembly and the second stabilizing assembly; and a rotating assembly is provided in the limiting assembly and is configured to cooperate with the third stabilizing assembly to control the second stabilizing assembly to rotate.

2. The ultrasonic gas meter based on the shunt metering device according to claim 1, wherein an inlet end of the gas meter casing is provided with a filter screen for filtering out an impurity.

3. The ultrasonic gas meter based on the shunt metering device according to claim 1, wherein the first stabilizing assembly comprises a first baffle for blocking the gas; upper and lower ends of a side of the first baffle are respectively provided with first connecting rings for limiting the first baffle; an end of each of the first connecting rings is provided with a first tooth block set for cooperating with the limiting assembly to control the first baffle to rotate; a middle of each of the first connecting rings is provided with a first connecting hole for the limiting assembly to rotate; and inner walls of upper and lower ends of a cavity of the first connecting hole are respectively provided with first limiting ring elements for cooperating with the limiting assembly to limit the first stabilizing assembly.

4. The ultrasonic gas meter based on the shunt metering device according to claim 1, wherein the second stabilizing assembly comprises a second baffle for cooperating with the first baffle to block the gas; upper and lower ends of a side of the second baffle are respectively provided with second connecting rings for limiting the second baffle; an end of each of the second connecting rings is provided with a second tooth block set for cooperating with the limiting assembly to control each of the first connecting rings to rotate; the first connecting hole is concentric with a second connecting hole; and the first connecting rings are located between the two second connecting rings.

5. The ultrasonic gas meter based on the shunt metering device according to claim 4, wherein a middle of each of the second connecting rings is provided with the second connecting hole for the limiting assembly to rotate; inner walls of upper and lower ends of a cavity of the second connecting hole are respectively provided with second limiting ring elements for cooperating with the limiting assembly to limit the second stabilizing assembly; and a middle of the cavity of the second connecting hole is provided with a third tooth block set for cooperating with the rotating assembly to control the second stabilizing assembly to rotate.

6. The ultrasonic gas meter based on the shunt metering device according to claim 1, wherein the third stabilizing assembly comprises a third baffle and first limiting rods, wherein a first end of each of the first limiting rods is provided with a fourth tooth block set for controlling the rotating assembly to rotate, and a second end of each of the first limiting rods is connected to the third baffle for controlling each of the first limiting rods to extend and retract.

7. The ultrasonic gas meter based on the shunt metering device according to claim 1, wherein the limiting assembly comprises a second limiting rod; upper and lower ends of the second limiting rod are respectively provided with limiting holes for limiting the first limiting rods; the upper and lower ends of the second limiting rod are further respectively provided with first limiting ring grooves for second limiting ring elements to rotate; the upper and lower ends of the second limiting rod are further respectively provided with second limiting ring grooves for first limiting ring elements to rotate; and the limiting holes, the first limiting ring grooves, and the second limiting ring grooves are arranged on a rod body of the second limiting rod in an order below: a first limiting hole of the limiting holes, a limiting ring groove of the first limiting grooves, a limiting ring groove of the second limiting grooves, another limiting ring groove of the second limiting grooves, another limiting ring groove of the first limiting grooves, and a second limiting hole of the limiting holes.

8. The ultrasonic gas meter based on the shunt metering device according to claim 7, wherein upper and lower ends of the rod body of the second limiting rod are respectively provided with fan-shaped grooves for the rotating assembly to rotate; the fan-shaped grooves are located between adjacent first limiting ring grooves; the upper and lower ends of the second limiting rod are further respectively provided with first gears for cooperating with the second connecting rings to control the first connecting rings to rotate in reverse; a middle of each of the first gears is connected to a connecting rod for cooperating with the second limiting rod to limit each of the first gears; and the connecting rod is located between the first limiting ring groove and the second limiting ring groove.

9. The ultrasonic gas meter based on the shunt metering device according to claim 1, wherein the rotating assembly comprises a long rod; upper and lower ends of the long rod are respectively provided with second gears for cooperating with the first limiting rods to control the long rod to rotate; the upper and lower ends of the long rod are further respectively provided with special-shaped gears for controlling a second baffle to rotate; and the special-shaped gears are respectively meshed with third tooth block sets.

\* \* \* \* \*